Jan. 3, 1950 A. W. VINCENT 2,493,174
INTERCOMMUNICATING TELEPHONE SYSTEM
Filed Nov. 5, 1946
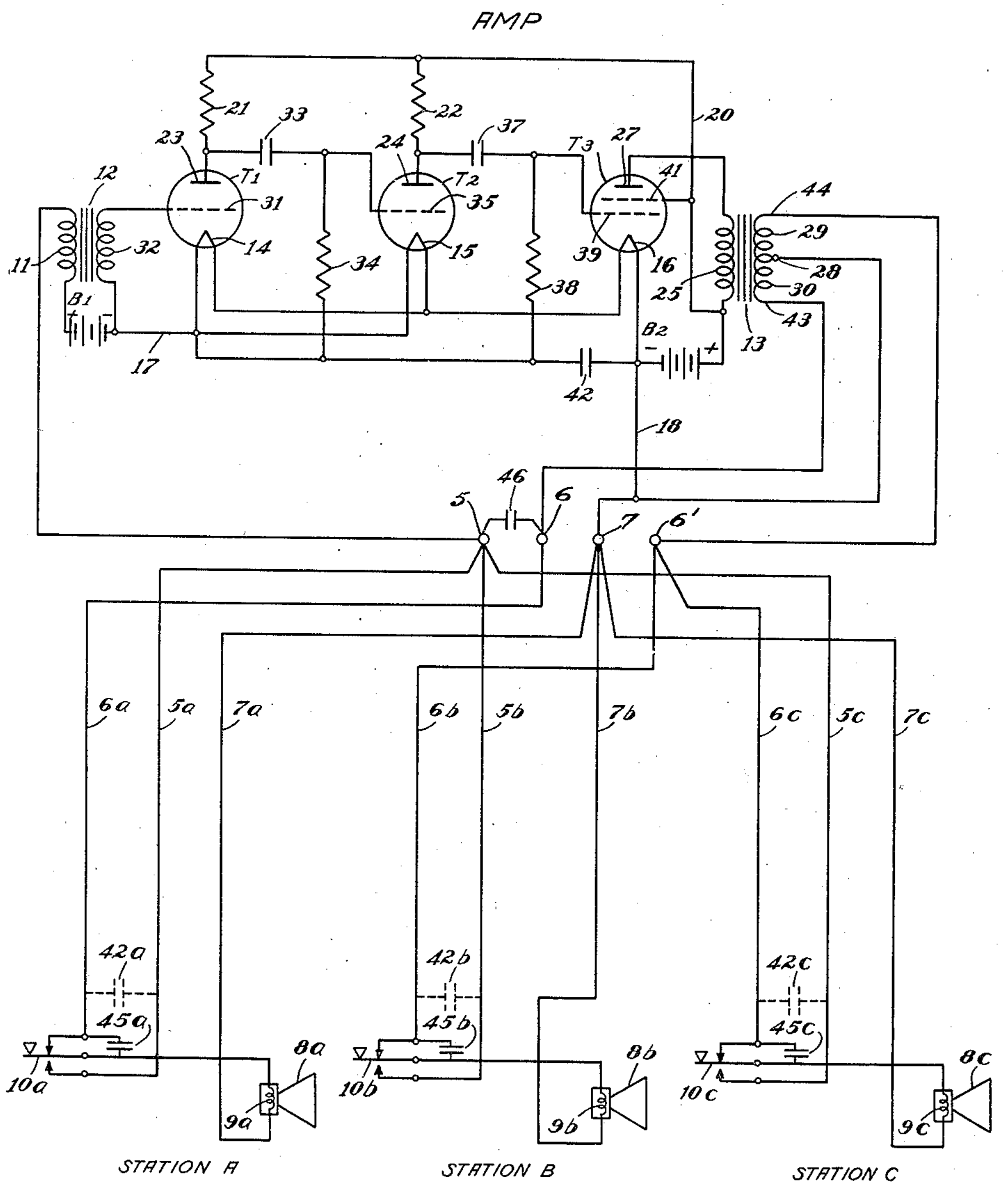
INVENTOR.
ANDREW W. VINCENT
BY D. Clyde Jones
ATTORNEY Patented Jan. 3, 1950

2,493,174

UNITED STATES PATENT OFFICE 2,493,174

INTERCOMMUNICATING TELEPHONE SYSTEM

Andrew W. Vincent, Rochester, N. Y.

Application November 5, 1946, Serial No. 707,867

7 Claims. (Cl. 179—1)

This invention relates to an intercommunicating telephone system of the type in which a transducer at each station is used both for talking as well as for listening and the several stations are linked together through an electronic amplifier.

It is the purpose of this invention to provide a system of the type mentioned which is simple to manufacture, which can be readily installed by workmen of limited skill and which is energized by direct current of such low voltage that there is virtually no fire hazard.

The main feature of the invention relates to an intercommunicating system of the electronic amplifier type, wherein the filamentary cathodes of the several tubes, are energized in series with the "talking" conductors leading from a calling station to the input of the amplifier and wherein the voltage generated at the calling station by speaking into its transducer will be shunted from the tube filaments but will be applied to the input of the amplifier.

Another feature of the invention relates to the novel arrangement and connection of the various conductors from the several stations to the amplifier whereby feedback action and resulting undesired oscillations are avoided.

Other features of the invention will appear from the detailed description and claims when taken with the drawing wherein the single figure is a circuit diagram of a preferred form of the invention.

In this preferred form of the invention, there are provided a plurality of stations A, B, C, etc., each linked by the multiple connected input wires 5a, 5b, 5c, etc., as well as by the multiple connected output wires, 6a, 6b, 6c, etc., and by the multiple connected "common" wires 7a, 7b, 7c, etc., to an audio amplifier generally designated AMP. The input wires 5a, 5b and 5c are multiple connected at junction point 5, and the common wires 7a, 7b and 7c are multiple connected at junction point 7. The output wire 6a is connected to junction point 6 and the output wires 6b and 6c are connected to the junction point 6′. At each station there is located a transducer 8a, 8b, 8c, etc. in the form of a moving coil or dynamic loud speaker of the permanent magnet type. The moving coil, such as 9a, of the transducer is normally connected by a manually operated switch 10a in series with the output conductor 6a and the common conductor 7a which is connected to the amplifier ground return lead 18 (not earth ground), in readiness to receive a message from the output of the amplifier. However, when the switch 10a is held in its alternate position, the moving coil 9a is connected in series with the input conductor 5a and the common conductor 7a, for transmitting a message to the input of the amplifier. The switches 10b and 10c serve a similar purpose at their respective stations B and C.

The amplifier AMP is preferably of the multistage capacity-coupled type and uses quick heating vacuum tubes energized from batteries such as are used for the filament supply and plate supply in portable radio receivers. In the preferred form of the invention, the amplifier comprises the two triodes T1, and T2 which may have their several electrodes enclosed in one envelope, and also comprises the screen grid tube T3 of the well known type. Each station such as A, when its manual switch such as 10a is operated, is connected by the input transformer 12 to the input of the amplifier AMP while the remaining stations, where their manual switches are in their normal positions, are connected to the output of the amplifier by the output transformer 13. The closure of the manual switch 10a at the station A closes a direct current circuit for heating the filaments 14, 15 and 16 of vacuum tubes T1, T2, and T3. This circuit can be traced from the negative pole of battery B1, conductor 17, through filaments 14 and 15 in multiple, thence in series with filament 16, conductor 18, common conductor 7a, the coil of transducer 8a, switch 10a, now closed, input conductor 5a, thence through the primary winding 11 of the input transformer 12, to the positive pole of battery B1. The plate battery B2 has its negative pole connected to the conductor 18 from which the common conductors 7a, 7b and 7c, branch. The positive pole of battery B2 is connected by conductor 20 and through the resistors 21 and 22 in multiple to the anodes 23 and 24 of the tubes T1 and T2. The positive pole of battery B2 is connected through the primary winding 25 of the output transformer 13 to the anode 27 of the tube T3. The low impedance secondary winding of the output transformer has a mid-tap 28 which divides this winding into sections 29 and 30 for a purpose to be described.

The input circuit of the tube T1 includes the grid 31 of this tube, secondary winding 32 of the input transformer, conductor 17, to the filament 14. The condenser 33 and resistor 34 couple the output of tube T1 to the input circuit of tube T2, which circuit includes the grid 35 and filament 15. The condenser 37 and resistor 38 couple the output of the tube T2 to the input circuit of the tube T3, the input circuit including the control grid 39 and filament 16 of the tube T3. The screen grid 41 of this tube is connected to the plate supply conductor 20. A high capacity low voltage capacitor 42 is connected across the series connected tube filaments 14, 15 and 16 so that the talking voltage generated at the speaker station will not appear across the tube filaments, which have a high impedance relative to the speaker voice coil impedance, but will be shunted by the capacitor and will be applied across the low impedance amplifier input.

Since the output wires, such as 6*a*, and the input wires such as 5*a* extend closed together with the respective common wires from the amplifier to each station, such as 7*a*, there is enough capacitance, represented by the dotted condensers, such as 42*a*, 42*b* and 42*c* between these wires to couple the output wire to the input wire, thereby producing a feedback voltage and an undesirable oscillation of the amplifier. This condition is obviated by using a center tapped output transformer secondary winding having the sections 29 and 30 and balancing the station wire lengths between the two output terminals 43 and 44 which are 180° out of phase, so that voltages fed back to the input wire are cancelled out. If equal line lengths are not used, the balance can be made with a capacitor, such as 46, equivalent in capacity to the unbalanced length of wire.

In the case of long line conductors, such as 5*a*, 6*a* and 7*a* on one or more stations, the voltage drop in the common conductor 5*a*, when its associated transducer 10*a* is connected in the normal output circuit, is coupled to the input conductor 5*a* by the distributed capacitance such as 42*a* of the conductors. Incidentally, a line may be considered to be long when its line resistance is comparable to the impedance of its transducer. Since this unbalance does not exist when the station A is used to originate a call the capacitance unbalance must be compensated for at the remaining stations B and C. A compensating capacitor 45*a* is placed across the normally closed contacts of the switch such as 10*a* at the originating station so that the out of phase output voltage is coupled to the input circuit only when the station originates a call. Other stations on the same output conductor must be individually balanced in the same manner by compensating capacity, such as 45*b* and 45*c*.

What I claim is:

1. In an intercommunicating telephone system, a plurality of stations each provided with a transducer for transmitting and receiving signals, an audio amplifier having an input portion and an output portion, said amplifier including at least one electron tube provided with a filamentary cathode, a source of direct current, each station having an input conductor coupled to the input portion of the amplifier as well as an output conductor coupled to the output portion of said amplifier and a common conductor connected to said amplifier, a manual switch at each station normally connecting the transducer thereat in circuit with the output conductor and with the common conductor thereof in readiness for the reception of signals from said amplifier, the switch at each station being operable at will to connect the transducer thereat in circuit with the input conductor and with the common conductor thereof for the transmission of signals from the station with the operated switch, and a circuit completed by said last-mentioned switch and including in series said cathode, said source of direct current together with said last-mentioned input and common conductors.

2. In an intercommunicating telephone system, a plurality of stations each provided with a transducer having a voice coil for transmitting and receiving signals, an audio amplifier having an input portion and an output portion, said amplifier including at least one electron tube provided with a filamentary cathode, a source of direct current, each station having an input conductor coupled to the input portion of the amplifier as well as an output conductor coupled to the output portion of said amplifier and a common conductor connected to said amplifier, a manual switch at each station normally connecting the transducer thereat in circuit with the output conductor and with the common conductor thereof in readiness for the reception of signals from said amplifier, the switch at each station being operable at will to complete a series circuit including the voice coil as well as the input and common conductors of the station together with said cathode and said direct current source.

3. In an intercommunicating telephone system, a plurality of stations each provided with a transducer for transmitting and receiving signals, an audio amplifier having an input transformer provided with a primary winding and a secondary winding, said amplifier having an output portion and including at least one electron tube provided with a filamentary cathode, an input circuit for said amplifier including said cathode and said secondary winding, a source of direct current, each station having an input conductor connected to one terminal of said primary winding as well as an output conductor coupled to the output portion of said amplifier and a common conductor connected to the other terminal of said primary winding and to the output of said amplifier, a manual switch at each station normally connecting the transducer thereat in circuit with the output conductor and with the common conductor thereof in readiness for the reception of signals from said amplifier, and a circuit completed by a manual switch when operated and including in series said cathode, said source of direct current, and said primary winding together with the input and common conductors individual to the operated switch, and a capacitor connected in shunt of said filament whereby signal current is diverted from said filament.

4. In an intercommunicating telephone system, a plurality of stations each provided with a transducer having a voice coil for transmitting and receiving signals, an audio amplifier having an input transformer provided with a primary winding and a secondary winding, said amplifier having an output portion and including electron tubes provided with filamentary cathodes, said cathodes having a high impedance relative to the impedance of a given voice coil, an input circuit for said amplifier including said cathode and said secondary winding, a source of direct current, each station having an input conductor connected to one terminal of said primary winding as well as an output conductor coupled to the output portion of said amplifier and a common conductor connected to the other terminal of said primary winding and to the output of said amplifier, a manual switch at each station normally connecting the voice coil of the transducer thereat in circuit with the output conductor and with the common conductor thereof for the reception of signals from said amplifier, and a circuit completed by a manual switch when operated and including in series said cathodes, said source of direct current, and said primary winding together with the input and common conductors as well as the voice coil of the transducer individual to the operated switch, and a capacity in shunt of the cathodes.

5. In an intercommunicating telephone system, a plurality of stations each provided with a transducer for transmitting and for receiving signals, an electronic audio amplifier having an input portion and an output portion, each station having an input conductor coupled to the input portion of the amplifier as well as an output conductor coupled to the output portion of said amplifier and a common conductor connected to said amplifier, a manual switch at each station normally connecting the transducer thereat in circuit with the output conductor and with the common conductor thereof for the reception of signals from said amplifier, the switch at each station being operable at will to connect the transducer thereat in circuit with the input conductor and with the common conductor thereof for the transmission of signals from the station to each of the other stations while the switch is operated, and means for neutralizing the capacity effects between said input conductors and said output conductors whereby feedback effects with resulting oscillation of said amplifier is obviated.

6. In an intercommunicating telephone system, a plurality of stations each provided with a transducer for transmitting and receiving signals, an electronic audio amplifier having an input portion and an output transformer provided with a primary winding and a secondary winding having two output terminals and a mid-tap terminal connected between said output terminals, each station having an input conductor coupled to the input portion of the amplifier as well as an output conductor connected to one of the output terminals and a common conductor connected to said mid-tap terminal, certain of said output conductors being connected to one of said output terminals and the remainder of said output conductors being connected to the other output terminal to electrically balance the capacity effects between certain of the conductors of one station against the capacity effects between certain of the conductors of other stations, a manual switch at east station normally connecting the transducer thereat in circuit with the output conductor and with the common conductor thereof for the reception of signals from said amplifier, the switch at each station being operable at will to connect the transducer thereat in circuit with the input conductor and with the common conductor thereof for the transmission of signals from the station with the operated switch, and means including a capacitor at certain of said stations for compensating for unbalance due to long lengths of conductors.

7. In an intercommunicating telephone system, a plurality of stations each provided with a transducer for transmitting and receiving signals, an electronic audio amplifier having an input portion and an output transformer provided with a primary winding and a secondary winding having two output terminals and a mid-tap terminal connected between said output terminals, each station having an input conductor coupled to the input portion of the amplifier as well as an output conductor connected to one of the output terminals and a common conductor connected to said mid-tap terminal, certain of said output conductors being connected to one of said output terminals and the remainder of said output conductors being connected to the other output terminal to electrically balance the capacity effects between certain of the conductors of one station against the capacity effects between certain of the conductors of other stations, a manual switch at each station having normally closed and normally open contacts, the normally closed contacts connecting the transducer thereat in circuit with the output conductor and with the common conductor thereof for the reception of signals from said amplifier, the switch at each station being operable at will to close its normally open contacts to connect the transducer thereat in circuit with the input conductor and with the common conductor thereof for the transmission of signals from the station with the operated switch, and means including a compensating capacitor connected across the normally closed contacts at each of certain of said stations for compensating for unbalance due to long line conductors.

ANDREW W. VINCENT.

REFERENCES CITED

The following references are of record in the file of this patent:

UNITED STATES PATENTS

| Number | Name | Date |
|---|---|---|
| 2,099,442 | Howell | Nov. 1, 1937 |
| 2,249,456 | Campbell | July 15, 1941 |